Sept. 28, 1965   A. P. FREITAS ETAL   3,208,770
FIFTH WHEEL PNEUMATIC SUSPENSION SYSTEM
Filed April 6, 1962   2 Sheets-Sheet 1

INVENTOR.
ANTHONY P. FREITAS
GRENVILLE C. STONE
BY FULWIDER, MATTINGLY
& HUNTLEY

ATTORNEYS

INVENTOR.
ANTHONY P. FREITAS
GRENVILLE C. STONE
BY FULWIDER, MATTINGLY
& HUNTLEY

ATTORNEYS

United States Patent Office 3,208,770
Patented Sept. 28, 1965

3,208,770
FIFTH WHEEL PNEUMATIC SUSPENSION SYSTEM
Anthony P. Freitas, Southgate, and Grenville C. Stone, Compton, Calif. (both of 18033 S. Santa Fe Ave., Long Beach, Calif.)
Filed Apr. 6, 1962, Ser. No. 185,695
9 Claims. (Cl. 280—440)

The present invention relates generally to fifth wheel pneumatic suspension systems for truck trailers, but more particularly to suspension systems which are formed integrally with the trailers.

The present day trucking industry transports many different kinds of commodities, ranging from foodstuffs and large, heavy industrial equipment, to devices which are extremely delicate and fragile. It has been an objective of the trucking industry to be able to transport substantially any type of commodity without damaging it through rough handling and the like. This has been particularly important in the transporting of certain types of instruments. For instance, within the past decade many "highly sophisticated" delicate electronic instruments have been developed to satisfy requirements in the fields of advanced communications, space flights and the like. To prevent damage to such extremely delicate and sensitive instruments during transportation thereof, the trucking equipment used must be specially built to provide an unusually "soft ride."

Heretofore, pneumatic suspension systems have been used for the rear end of truck trailers to assist in providing the desired "soft ride." However, the forward end of such trailers have not been provided with pneumatic suspension means, but rather the fifth wheel of the truck tractor itself has been mounted on the tractor frame by appropriate pneumatic suspension means. Thus, although it heretofore has been possible to provide a pneumatically suspended truck trailer, it has required not only a special type of rear axle suspension, but also a tractor which is specially constructed with pneumatic suspension means for the fifth wheel.

This has not proved satisfactory, since in the event of a breakdown in the specially constructed tractor, it has been necessary to locate another specially-built tractor as a replacement. That is, the usual flexibility of being able to haul substantially any trailer with a given tractor and to use substantially any tractor to haul a given trailer was lost. This has resulted in needless idle equipment. Accordingly, it is an object of the present invention to provide a truck trailer having pneumatic suspension means whereby it can be used with any conventional standard tractor.

It is an object of the present invention to teach the construction of a truck trailer whereby both its rearward and forward end portions are provided with pneumatic suspension means.

Another object of the present invention is to provide a trailer as characterized above which can be coupled to any conventional tractor, and which will provide pneumatic suspension for the entire platform or van mounted on the chassis of the trailer.

Another object of the present invention is to provide pneumatic suspension means as characterized above which is formed integrally with the trailer.

Another object of the present invention is to provide a pneumatic suspension system for the forward end of a trailer which affords maximum stability for the cargo or load.

Another object of the present invention is to provide a pneumatic suspension system for a trailer such that each side of the forward end of the trailer is controlled separately so that the platform or van is automatically maintained level.

Another object of the present invention is to provide a pneumatic suspension system as characterized above which is coupled to the pneumatic brake system normally employed in truck trailers, there being means for preventing any interference whatever with the brake system by the pneumatic suspension means.

A still further object of the present invention is to provide a pneumatic suspension system for the forward end of a trailer for maintaining the trailer in a fixed relation to the tractor regardless of variations in load or forces acting thereon.

Another object of the present invention is to provide a pneumatic suspension system as characterized above which is simple and inexpensive to manufacture and which is rugged and dependable in operation.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

Like reference characters indicate corresponding parts throughout the several views of the drawings.

Figure 1:
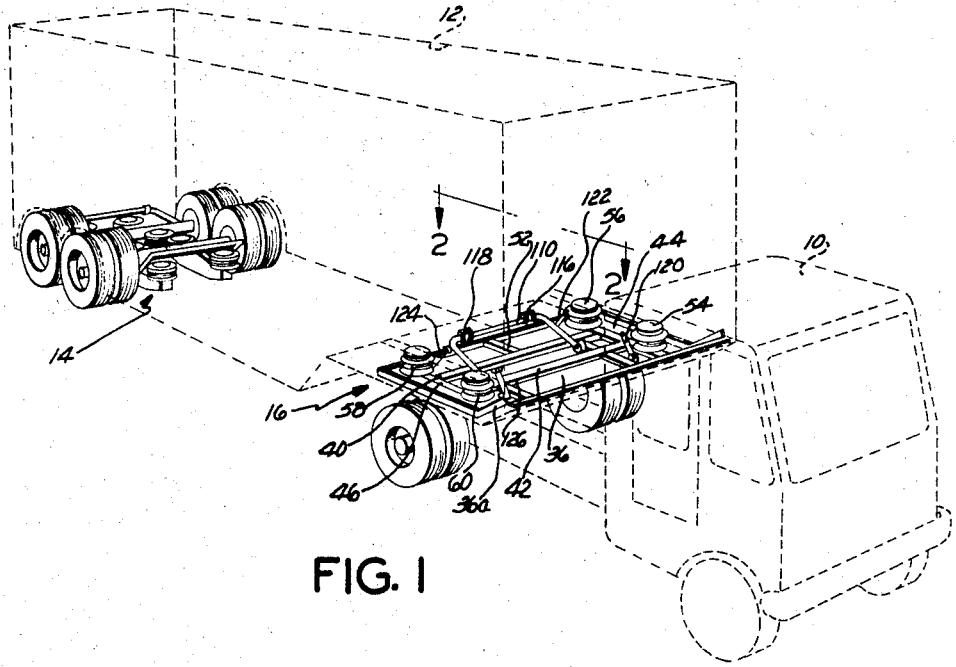
FIGURE 1 is a perspective phantom view of a tractor and trailer, the latter of which is equipped with both rearward and forward pneumatic suspension systems.

Referring to FIGURE 1 of the drawings, there is shown therein in broken lines a conventional truck tractor 10 connected to a truck trailer 12 provided with a rear suspension system 14 and a fifth wheel pneumatic suspension system 16 according to the present invention. Tractor 10 has both forward and rearward wheels, the latter of which also support the forward end of the trailer as shown.

The rear axle pneumatic suspension system shown in FIGURE 1 is the subject matter of our copending patent application Serial No. 82,328, filed January 12, 1961, now abandoned, for Vehicle Pneumatic Suspension System. Accordingly, such rear axle suspension system will not be explained herein in detail.

The connection means between tractor 10 and trailer 12 comprises a plate or disc mounted on the back of the tractor and formed with a slot to receive a king pin carried by the trailer. The king pin is held in engagement with such plate by conventional means for that purpose.

Figure 2:
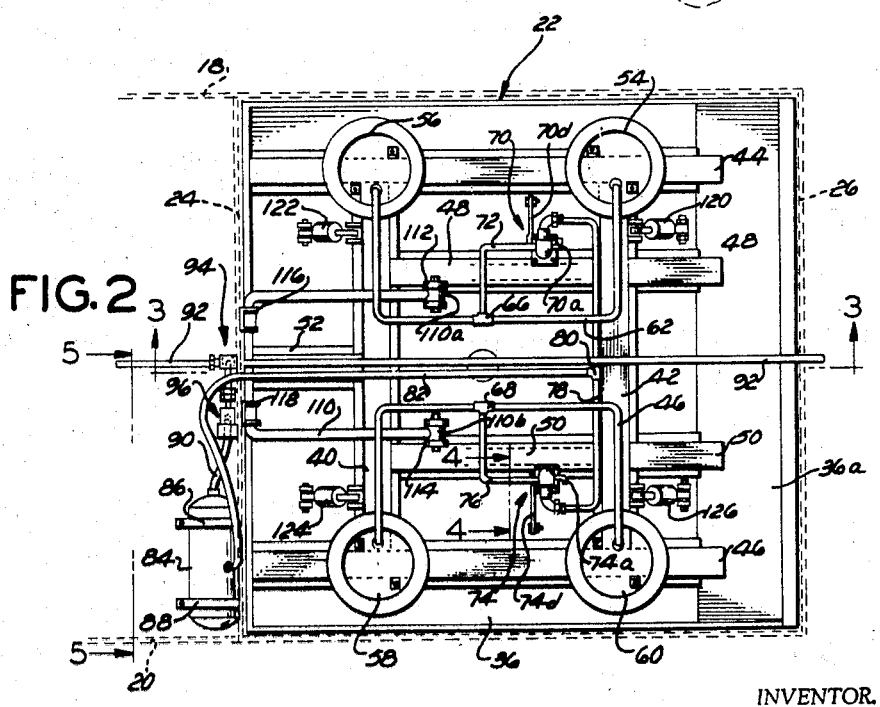
FIGURE 2 is a top plan view of the forward suspension system taken substantially along line 2—2 of FIGURE 1.

The construction of a truck trailer usually includes a pair of U-shaped channel members which extend longitudinally of the trailer along the opposite sides thereof. Such channel members are positioned in opposed relation and are shown in FIGURE 2 at 18 and 20. They are commonly called rub rails and constitute structural members for the trailer 12.

Figure 3:
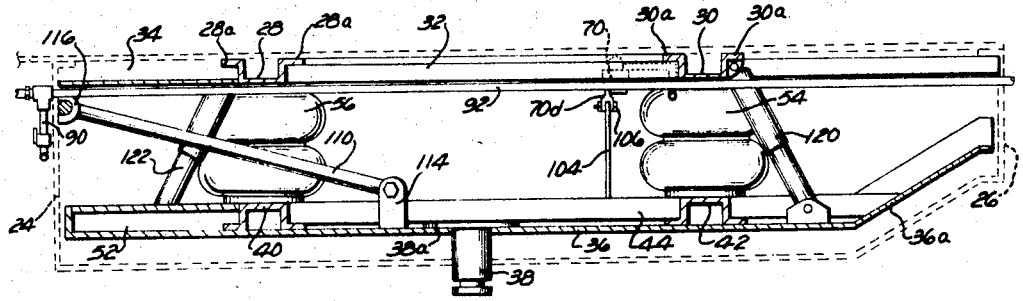
FIGURE 3 is a sectional view taken substantially along line 3—3 of FIGURE 2.

As shown most claerly in FIGURES 2 and 3 of the drawings, an enclosure 22 is formed at the forward end of the trailer 12 by means of the opposed rub rails 18 and 20, and rearward and forward end plates 24 and 26. Such members, of course, are welded together to provide a square or rectangular box-like structure of depth corresponding to the distance between the flanges of the opposed U-shaped rub rails.

As shown most clearly in FIGURE 3 of the drawings, suitable lateral structural members such as shown at 28 and 30 may be attached to the underside of the cargo area of the trailer 12 as by welding or the like. Each of the support members 28 and 30 is provided with a pair of coplanar outwardly extending elongated flanges 28a and 30a respectively which abut the underside of the cargo section. Suitable longitudinal support members may also be employed as shown at 32 and 34. Each of these members as shown in the disclosed embodiment of the present invention is of the same general configuration as members 28 and 30, the support member 32 being laterally spaced from the member 34.

Forming the lower end wall of the above-described enclosure 22 is a king pin plate or fifth wheel plate 36 which carries a king pin 38. Pin 38 is rigidly attached to plate 36 by any appropriate means as by welding.

The lower end wall 36 of enclosure 22 may be suitably reinforced by transverse channel members 40 and 42 and by longitudinal side support members 44 and 46 and longitudinal intermediate support members 48 and 50. Whereas members 44 and 46 may extend the entire length of plate 36, the support members 48 and 50 are interrupted because of transverse members 40 and 42. In addition thereto, a short reinforcing member 52 may be povided between the rear edge of plate 36 and the transverse support member 40. Each of the reinforcing members for plate 36 may be provided with elongated side flanges welded to he upper face of plate 36.

As will be readily understood by those persons skilled in the art, the particular construction of plate 36 shown in the drawings is not material to the scope of the present invention. Rather, any strengthening means in accordance with good engineering practices is contemplated within the scope of this invention. The reinforcing means employed on the upper end wall for enclosure 22 also may take any desired form, and may correspond to the strengthening means employed on plate 36.

Plate 36 is positioned within enclosure 22 between the rub rails 18 and 20, and is of such size and shape as to be limited to vertical rectilinear movement therewithin. It is desirable that plate 36 fit snugly within the rub rails 18 and 20 with respect to the forward and rearward end walls 26 and 24 respectively of enclosure 22.

Interposed between the movable bottom wall 36 and the relatively stationary upper wall of enclosure 22 are four inflatable and deflatable air cushions 54, 56, 58 and 60 which are arranged in pairs on opposite sides of plate 36. To provide the desired stability, as will hereinafter become more apparent, the cushions of each pair are arranged in spaced relation in close proximity to the respective rub rail as shown in FIGURE 2. As shown most clearly in FIGURES 2 and 3 of the drawings, each such air cushion is firmly fastened to the strengthening members in the upper and lower end walls of enclosure 22 by any suitable or appropriate means corresponding to the construction of the cushions.

The pneumatic cushions 54, 56, 58 and 60 are formed of flexible material which is expansible and contractible. Each such cushion is formed as an hermetically sealed enclosure and is provided with suitable pipe fittings or hose connections whereby the fluid pressure within such cushions can be varied to thereby vary the expansion or contraction thereof.

By means of such fittings, the cushions 54 and 56 of the left-hand side of the forward end of trailer 12 are connected to a left side manifold 62. In like fashion the cushions 58 and 60 on the right-hand side of the trailer are connected to a right side manifold 64. Each side manifold is provided with a T pipe fitting as shown at 66 and 68.

On each side of king pin plate 36 there is provided a control valve. On the left side of such plate there is provided a valve 70 having an outlet port connected to one end of a conduit 72, the other end of which is connected to the T pipe fitting 66. In like fashion, there is provided a valve 74 on the right side of plate 36, said valve 74 having an outlet port connected to a conduit 76 which, in turn, is connected to fitting 68.

Each of the valves 70 and 74 is provided with an inlet port which is connected to a main manifold 78. Manifold 78 is also provided with a T pipe fitting 80 which is connected to a main fluid line 82. The inlet end of line 82 is connected to a reservoir tank 84 which is suitably fastened to the underside of the trailer cargo section as by straps 86 and 88 as shown in FIGURE 2. Alternatively, of course, tank 84 could be fastened to the rear end wall 24 of enclosure 22 if desired.

For supplying reservoir tank 84 with the necessary pressurized fluid, there is provided an inlet conduit 90, one end of which is connected to the air brake line of the trailer as shown at 92. A suitable fitting 94 is provided in line 92 to properly connect tank 84 to the brake line.

As will be hereinafter explained in greater detail, interposed between tank 84 and the brake line 92 are suitable flow-control devices 96. These devices are operatively positioned in the conduit 90 and include pressure regulating means for regulating the fluid pressure supplied to tank 84 from line 92, and also pressure responsive flow control means for insuring that fluid pressure will not be supplied to tank 84 when the pressure within the brake line 92 is below a predetermined safe minimum.

Figures 4, 5:
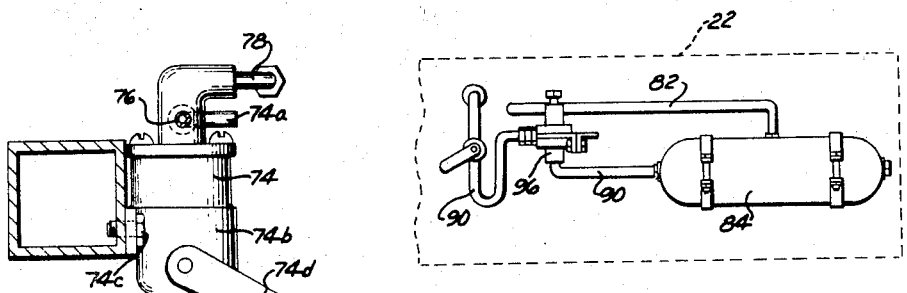
FIGURE 4 is a fragmentary sectional view taken substantially along line 4—4 of FIGURE 2.
FIGURE 5 is a fragmentary sectional view taken substantially along line 5—5 of FIGURE 2.
Figure 6:
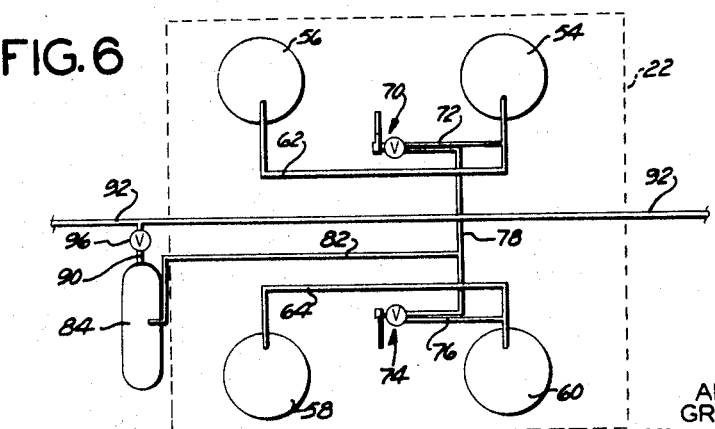
FIGURE 6 is a schematic diagram of the pneumatic control means for the subject system.

In addition to the aforementioned inlet and outlet ports for each of the valves 70 and 74, there is provided in each thereof an exhaust port shown at 70a and 74a respectively. Valves 70 and 74 also comprise valve bodies which, as shown at 74b of FIGURE 4, are secured to the trailer, as by being bolted to appropriate support members. Each of these valves is also provided with an actuating lever 70d and 74d respectively which, as shown most clearly in FIGURE 4, has one of its ends pivotally mounted with respect to the body of the valve while the other end is pivotally mounted with respect to the king pin plate 36. As seen in FIGURE 4, one end of the lever 74d is pivotally mounted on valve body 74b while the other end is attached by means of a bolt 98 and a lever 100 to an ear 102 fixed to plate 36. As will hereinafter become more apparent, lever 100 is desirable to prevent binding of the various parts in the translating of the rectilinear movement of plate 36 into pivotal movement of operating lever 74d of valve 74. As shown in FIGURE 3 of the drawings, there is a similar lever 104 pivotally attached to the end of lever arm 70d of valve 70 by means of a pivot pin 106.

To transmit the forward motion of the tractor 10 to the trailer 12 without creating undue strain on the pneumatic suspension system, there is provided a generally U-shaped tow bar 110 the opposite ends of which are pivotally connected to upstanding pairs of ears 112 and 114. To accomplish this, each end of bar 110 is provided with a transverse pipe section as shown at 110a and 110b. Each pipe section is insertable between the ears of the respective pair thereof, a fastening bolt being employed to pivotally mount the pipe sections in such positions. As will hereinafter become more apparent, in order to prevent tilting of king pin plate 36 it is desirable that the pair of upstanding ears 112 and 114 be mounted on plate 36 in transverse horizontal alignment with the king pin 38 thereon.

The intermediate portion of the U-shaped tow bar 110 is pivotally attached to the trailer 12 by means of brackets 116 and 118. Such brackets may be welded to the underside of the cargo section of the trailer, or they may be welded to the rear end wall 24 of enclosure 22 to provide a firm anchor for the tow bar.

Four shock absorbing units 120, 122, 124 and 126 are also interposed between the upper and lower end walls of the enclosure 22 in close proximity to the pneumatic cushions. Each such shock absorbing unit is of relatively standard design and construction, and is intended to dampen the relative movement between the trailer and the tractor as will hereinafter become more apparent.

The forward suspension system shown in FIGURE 1 and described above in detail, operates generally as follows. By means of the pneumatic brake system as represented by the air brake line 92 in the drawings, the reservoir tank 84 of the system is filled with fluid pressure. This, of course, is possible only after trailer 12 is properly attached to tractor 10 by means of king pin 38 which depends from king pin plate 36. That is, truck equipment of this general type generally comprises a compressor unit carried on the tractor and used for supplying fluid pressure for operating the brakes of both the tractor and the trailer. Thus once the trailer is properly attached to the tractor and the brake system of the trailer connected to the compressor, there is sufficient fluid pressure in the brake line 92 to actuate the pressure responsive flow control device in conduit 90 for filling tank 84. Typically, such pressure responsive flow control device may be adjusted to a predetermined value, such as 65 pounds per square inch, so that in the event the pressure in the brake system drops beneath this value, the suspension system is effectively disconnected therefrom.

The fluid pressure within tank 84 is provided at the inlet ports of the valves 70 and 74 through the pressure line 82 and the main manifold 78. Each of valves 70 and 74 is so constructed that as the actuating lever therefor is moved upwardly, fluid is permitted to flow from the inlet port to the outlet port thereof. Thus, as the forward end of the trailer is moved downwardly the king pin plate 36 is caused to move relatively upwardly within enclosure 22. This causes the actuating levers of the valves 70 and 74 to be rotated upwardly to thereby afford pressure to the air cushions through the side manifolds 62 and 64. Return of such actuating levers to a predetermined intermediate position, of course, causes such valves to interrupt fluid flow to the air cushions.

Such valves are further characterized by responding to downward rotational movement of the respective lever arms from such intermediate positions to exhaust fluid pressure from within the air cushions. That is, upon upward movement of the forward end of the trailer, the king pin plate 36 is caused to move relatively downwardly with respect thereto. This causes the actuating levers for the valves 70 and 74 to be rotated downwardly thereby connecting the outlet port of such valves with the respective exhaust ports thereof. Thus, in this manner the air cushions are deflated.

The lever arms 100 and 104 which connect the valve actuating levers to the king pin plate 36 are of such size and length that plate 36 is positioned in an intermediate position relative to rub rails 18 and 20 when the valves are in their intermediate or off positions. Thus, the forward end of the trailer is caused to "float," the plate 36 being approximately midway between its upper and lower extreme positions relative thereto.

As the load within the cargo section of the trailer is increased, the distance between the upper and lower end walls of enclosure 22 decreases accordingly. This causes the actuating levers for the valves 70 and 74 to be rotated relatively upwardly to cause fluid pressure to be applied to the air cushions 54, 56, 58 and 60. Such increase in pressure within the air cushions causes them to expand so as to increase the distance between the upper and lower end walls of enclosure 22. Thus the actuating levers of valves 70 and 74 are returned to their intermediate or off positions, and the king pin plate 36 is returned to its intermediate position relative to the forward end of trailer 12.

In the event a portion of the load within the cargo section of the trailer 12 is removed, the distance between the upper and lower end walls of enclosure 22 is increased. This effectively rotates the actuating levers of the valves 70 and 74 downwardly causing air to be exhausted from the air cushions to the atmosphere through the respective side manifolds, conduits and valves. The result of this, of course, is to permit the forward end of the trailer to be lowered toward the king pin plate 36 so as to return the valves 70 and 74 to their intermediate or off positions and plate 36 to its intermediate position relative to the rub rails 18 and 20.

It should be particularly noted that the pairs of air cushions on each side of plate 36 are independently controlled so that the aforedescribed function or operation can take place on only one side of the trailer in the event a condition is created which tends to tilt the trailer to one side. For instance, if a heavy load is added to or removed from one side of the cargo section of the trailer, there is a tendency for the trailer to tilt sideways. In this event, the appropriate one of the valves 70 and 74 is actuated so as to raise or lower the side of the trailer affected. This leveling operation is particularly desirable when a load is being transported around a corner at a reasonable speed. The centrifugal force tending to tilt the trailer sideways about a longitudinal axis is overcome by the appropriate cushions to return the forward end of the trailer to its predetermined position with respect to plate 36.

Throughout the above-explained operation of the pneumatic suspension system, the forward motion of the tractor 10 is applied to trailer 12 through the tow bar 110. Thus the pulling force is isolated from the suspension system to prevent damage thereto.

During hauling operation of a tractor and trailer as described herein, any vertical vibration of the tractor 10 due to uneven road surfaces and the like is absorbed by the suspension system before it reaches the trailer 12 and its cargo. As an additional aid in providing a "soft ride" for the cargo, shock absorbing units 120, 122, 124 and 126 are provided to become effective on the rebound motion of the forward end of the trailer to quelch any such vibration. That is, since the air cushions provide an extremely resilient support for the forward end of the trailer it will tend to vibrate or bounce upon the tractor being subjected to a single jolt. To diminish such vibration as rapidly as possible, the shock absorbing units are provided.

It is thus seen that the present invention provides a pneumatic suspension system for the forward end of a trailer whereby extremely delicate instruments can be safely transported over relatively rough and irregular roadways.

Although I have shown and described certain specific embodiments of my invention I am fully aware that many modifications thereof are possible. My invention, therefore, is not to be restricted except insofar as is necessitated by the prior art and by the spirit of the appended claims.

We claim:

1. A fifth wheel pneumatic suspension system for a trailer having a pair of opposed rub rails at its forward end comprising, a fifth wheel plate slidably mounted between said opposed rub rails, means restricting said plate to vertical rectilinear movement within said rails, four expansible and contractible pneumatic cushions interposed between said plate and the trailer, said cushions being arranged in pairs individually positioned adjacent a separate one of said rails, the cushions of each of said pair being in spaced relation adjacent the respective rail to support the forward end of said trailer at the lateral extremities thereof, and control means for said cushions comprising a source of fluid pressure connected to said cushions and two flow control valves individually operable to control the expansion and contraction of a separate one of said pair of cushions, each of said valves including exhaust means and having an actuating arm connected to the respective side of said plate whereby the opposite sides of the forward end of the trailer are separately controlled.

2. A fifth wheel pneumatic suspension system for a trailer comprising:
- a fifth wheel plate;
- unitary longitudinally extending tow means having laterally spaced portions mounted at their opposite extremities to said plate and to the forward extremity of the trailer for pivotal movement about transverse axes, said tow means being connected to said plate intermediate the forward and rearward extremities thereof and permitting lateral tipping of the trailer without significant lateral tipping of said plate;
- and a plurality of expansible and contractible pneumatic cushions interposed between said plate and said trailer to resiliently establish the distance therebetween.

3. A fifth wheel pneumatic suspension system for a trailer comprising:
- a fifth wheel plate;
- tow means including a pair of transversely spaced, longitudinally extending legs integrally connected together at one of their extremities, said legs being pivotally mounted at their opposite extremities to said plate and to said forward extremity of the trailer at opposite sides of a longitudinal axis between the sides of said plate for pivotal movement about transverse axes, and permitting lateral tipping of the trailer without significant lateral tipping of said plate;
- and a plurality of expansible and contractible pneumatic cushions interposed between said plate and said trailer to resiliently establish the distance therebetween.

4. A fifth wheel pneumatic suspension system for a trailer comprising:
- a fifth wheel plate;
- unitary longitudinally extending tow means having laterally spaced portions mounted at their opposite extremities to said plate and to the forward extremity of the trailer for pivotal movement about transverse axes, said tow means being connected to said plate intermediate the forward and rearward extremities thereof and permitting lateral tipping of the trailer without significant lateral tipping of said plate;
- laterally spaced first and second pluralities of expansible and contractible pneumatic cushions interposed between said plate and said trailer to resiliently establish the distance between said trailer and said plate;
- and first and second pluralities of laterally spaced damper means interposed between said plate and said trailer to damp oscillatory relative movement of said plate about said transverse axis.

5. A fifth wheel pneumatic suspension system for a trailer comprising:
- a fifth wheel plate;
- unitary longitudinally extending tow means having laterally spaced portions mounted at their opposite extremities to said plate and to the forward extremity of the trailer for pivotal movement about transverse axes, said tow means being connected to said plate intermediate the forward and rearward extremities thereof and permitting lateral tipping of the trailer without significant lateral tipping of said plate;
- longitudinally spaced apart first and second pluralities of expansible and contractible pneumatic cushions interposed between said plate and said trailer to resiliently establish the distance between said trailer and said plate;
- and first and second pluralities of longitudinally spaced apart damper means interposed between said plate and said trailer to damp oscillatory relative movement of said plate about said longitudinal axis.

6. A fifth wheel pneumatic suspension system for a trailer comprising:
- a fifth wheel plate;
- unitary longitudinally extending tow means having laterally spaced portions mounted at their opposite extremities to said plate and to the forward extremity of the trailer for pivotal movement about transverse axes, said tow means being connected to said plate intermediate the forward and rearward extremities thereof and permitting lateral tipping of the trailer without significant lateral tipping of said plate;
- laterally spaced apart first and second pluralities of expansible and contractible pneumatic cushions interposed between said plate and said trailer to resiliently establish the distance between said trailer and said plate;
- a source of fluid under pressure;
- means connecting said source to said cushions and including first and second valve means operative to control the flow of said fluid into and out of said first and second pluralities of cushions, respectively;
- and a pair of laterally spaced apart actuating means connected, respectively, to said first and second valve means, and located between said plate and said trailer whereby said pair of actuating means are responsive to relative movement therebetween to operate said first and second valve means.

7. A fifth wheel pneumatic suspension system for a trailer, said system comprising:
- a fifth wheel plate coupled to the forward extremity of said trailer;
- a plurlity of expansible and contractible pneumatic cushions interposed between said plate and said trailer, certain of said cushions being located adjacent one side of said trailer and certain of said cushions being located adjacent the opposite side of said trailer;
- a source of fluid under pressure;
- means connecting said source to said cushions and including a first flow control valve operative to control the flow of said fluid into and out of said cushions on said one side of said trailer, and including a second flow control valve operative to control the flow of said fluid into and out of said cushions on said opposite side of said trailer;
- and a pair of actuating arms connected to said first and second valves and movable in response to relative movement between said trailer and said plate to operate said first and second valves.

8. A fifth wheel pneumatic suspension system for a trailer, said system comprising:
- a fifth wheel plate coupled to the forward extremity of said trailer;
- first and second pairs of expansible and contractible pneumatic cushions interposed between said plate and said trailer adjacent opposite sides of said trailer;
- a source of fluid under pressure;
- means connecting said source to said cushions and including a first flow control valve operative to control the flow of said fluid into and out of said first pair of cushions, and including a second flow control valve operative to control the flow of said fluid into and out of said second pair of cushions;
- and a pair of actuating arms connected to said first and second valves and movable in response to relative movement between said trailer and said plate to operate said first and second valves.

9. A fifth wheel pneumatic suspension system for a trailer, said system comprising:
- a fifth wheel plate coupled to the forward extremity of said trailer;
- a plurality of expansible and contractible pneumatic cushions interposed between said plate and said trailer, certain of said cushions being located adjacent one side of said trailer and certain of said cushions being located adjacent the opposite side of said trailer;
- a source of fluid under pressure;
- and means connecting said source to said cushions and including control means operative in response to relative movement between said trailer and opposite sides of said plate to adjust the flow of said fluid into and out of said cushions on opposite sides of said plate.

References Cited by the Examiner

UNITED STATES PATENTS

| | | | |
|---|---|---|---|
| 2,481,817 | 9/49 | Bradley et al. | 280—44 X |
| 2,733,931 | 2/56 | Reid et al. | 280—44 X |
| 2,821,409 | 1/58 | Chalmers | 280—440 |
| 2,863,674 | 12/58 | Baade | 280—439 |
| 2,920,905 | 1/60 | Cekada | 280—440 |
| 2,989,983 | 6/61 | Valentine | 137—627.5 X |
| 3,095,987 | 7/63 | Sable | 280—44 X |

FOREIGN PATENTS

| | | |
|---|---|---|
| 1,193,008 | 4/59 | France. |
| 1,193,997 | 5/59 | France. |

PHILIP ARNOLD, *Primary Examiner.*

LEO FRIAGLIA, *Examiner.*